United States Patent
Israelsson et al.

(10) Patent No.: US 10,358,243 B2
(45) Date of Patent: Jul. 23, 2019

(54) INDUCTION SEALING DEVICE AND METHOD OF SEALING A PACKAGING MATERIAL USING SAID INDUCTION SEALING DEVICE

(71) Applicant: Tetra Laval Holdings & Finance S.A., Pully (CH)

(72) Inventors: Karl Israelsson, Malmö (SE); Håkan Andersson, Åkarp (SE); Marko Stajkovic, Malmö (SE); Louis Carlioz, Arlöv (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 253 days.

(21) Appl. No.: 15/304,472

(22) PCT Filed: Mar. 24, 2015

(86) PCT No.: PCT/EP2015/056173
§ 371 (c)(1),
(2) Date: Oct. 14, 2016

(87) PCT Pub. No.: WO2015/158508
PCT Pub. Date: Oct. 22, 2015

(65) Prior Publication Data
US 2017/0036797 A1    Feb. 9, 2017

(30) Foreign Application Priority Data

Apr. 16, 2014 (SE) .................................. 1450467
Dec. 1, 2014 (SE) .................................. 1451459

(51) Int. Cl.
*B65B 51/22*    (2006.01)
*B29C 65/36*    (2006.01)
(Continued)

(52) U.S. Cl.
CPC .......... *B65B 51/227* (2013.01); *B29C 65/368* (2013.01); *B29C 65/3656* (2013.01);
(Continued)

(58) Field of Classification Search
CPC ....... B65B 51/227; B65B 51/26; B65B 61/24; B65B 61/186; B29C 65/368;
(Continued)

(56) References Cited

U.S. PATENT DOCUMENTS 3,808,074 A    4/1974 Smith et al.
3,864,186 A    2/1975 Balla
(Continued)

FOREIGN PATENT DOCUMENTS

CH        676 958 A5    3/1991
CN        1688483 A    10/2005
(Continued)

OTHER PUBLICATIONS

SE434240B 0 Jul. 16, 1984 Bibliographic Data Sheet (Espacenet) providing translation of Abstract.*
(Continued)

*Primary Examiner* — Christopher T Schatz
*Assistant Examiner* — Cynthia L Schaller
(74) *Attorney, Agent, or Firm* — Knobbe, Martens, Olson & Bear, LLP (57) ABSTRACT

The present invention relates to an induction sealing device for heat sealing of packaging material. The sealing device comprises a conductor partly encapsulated in a supporting body for cooperation with the packaging material during sealing. The coil conductor has a reduced cross sectional area at at least one position along the coil conductor so as to concentrate the magnetic flux induced by the coil conductor
(Continued)

at the at least one position. The invention also relates to a method of heat sealing a packaging material using the induction sealing device.

20 Claims, 5 Drawing Sheets (51) Int. Cl.
| | |
|---|---|
| *B29C 65/74* | (2006.01) |
| *B29C 65/00* | (2006.01) |
| *B65B 51/26* | (2006.01) |
| *B65B 51/30* | (2006.01) |
| *B65B 9/20* | (2012.01) |
| *B65B 55/10* | (2006.01) |
| *B65B 61/18* | (2006.01) |
| *B65B 61/24* | (2006.01) |
| *B29K 23/00* | (2006.01) |

(52) U.S. Cl.
CPC ...... *B29C 65/3668* (2013.01); *B29C 65/7451* (2013.01); *B29C 66/1122* (2013.01); *B29C 66/232* (2013.01); *B29C 66/3462* (2013.01); *B29C 66/3472* (2013.01); *B29C 66/4312* (2013.01); *B29C 66/4322* (2013.01); *B29C 66/7234* (2013.01); *B29C 66/72321* (2013.01); *B29C 66/72328* (2013.01); *B29C 66/72341* (2013.01); *B29C 66/8122* (2013.01); *B29C 66/8126* (2013.01); *B29C 66/81427* (2013.01); *B29C 66/849* (2013.01); *B65B 9/20* (2013.01); *B65B 51/26* (2013.01); *B65B 51/30* (2013.01); *B29C 66/71* (2013.01); *B29K 2023/06* (2013.01); *B29K 2023/12* (2013.01); *B29K 2877/00* (2013.01); *B29K 2881/04* (2013.01); *B29K 2995/0008* (2013.01); *B65B 55/103* (2013.01); *B65B 61/186* (2013.01); *B65B 61/24* (2013.01)

(58) Field of Classification Search
CPC ............. B29C 66/1122; B29C 65/3668; B29C 66/232; B29C 66/849; B29C 65/3656; B29C 66/72321; B29C 66/3462; B29C 66/4322; B29C 66/4312; B29C 66/3472; B29C 66/71; B29K 2023/06; B29K 2877/00; B29K 2023/12; B29K 2995/0008
See application file for complete search history.

(56) References Cited

U.S. PATENT DOCUMENTS

| | | | |
|---|---|---|---|
| 4,169,004 A | 9/1979 | Kock et al. | |
| 4,704,509 A * | 11/1987 | Hilmersson | B29C 65/18 219/633 |
| 4,757,175 A | 7/1988 | Mohr et al. | |
| 4,776,980 A | 10/1988 | Ruffini | |
| 4,808,326 A | 2/1989 | Tanino et al. | |
| 5,250,140 A | 10/1993 | Hayashi et al. | |
| 5,418,069 A | 5/1995 | Learman | |
| 5,418,811 A | 5/1995 | Ruffini et al. | |
| 5,588,019 A | 12/1996 | Ruffini et al. | |
| 5,714,033 A | 2/1998 | Hayashi et al. | |
| 5,889,263 A | 3/1999 | Andersson | |
| 6,167,681 B1 | 1/2001 | Yano et al. | |
| 6,837,025 B2 | 1/2005 | Kume | |
| 2002/0108705 A1 | 8/2002 | Kume et al. | |
| 2006/0154052 A1 | 7/2006 | Waffenschmidt et al. | |
| 2010/0025391 A1 | 2/2010 | Palombini et al. | |
| 2010/0155390 A1* | 6/2010 | Hirota | H05B 6/362 219/645 |
| 2010/0180545 A1 | 7/2010 | Palmquist et al. | |
| 2011/0094672 A1* | 4/2011 | Wijk | B29C 66/1122 156/272.4 |
| 2013/0263556 A1 | 10/2013 | Babini et al. | |

FOREIGN PATENT DOCUMENTS

| | | |
|---|---|---|
| CN | 102181156 A | 9/2011 |
| EP | 0 225 392 A1 | 6/1987 |
| EP | 0 484 998 A1 | 5/1992 |
| EP | 0 653 899 A2 | 5/1995 |
| EP | 0 730 946 A2 | 9/1996 |
| EP | 0 796 718 A1 | 9/1997 |
| EP | 1 231 149 A1 | 8/2002 |
| EP | 1 234 771 A1 | 8/2002 |
| EP | 1 270 182 A1 | 1/2003 |
| EP | 1 270 182 B1 | 6/2008 |
| EP | 2 008 795 B1 | 8/2011 |
| EP | 2 781 325 A1 | 9/2014 |
| FR | 2 073 137 A5 | 9/1971 |
| JP | S57148619 A | 9/1982 |
| JP | S63-258729 A | 10/1988 |
| SE | 434240 B * | 7/1984 |
| WO | WO 01/085827 | 11/2001 |
| WO | WO 03/097332 A1 | 11/2003 |
| WO | WO 2015/158502 A1 | 10/2015 |

OTHER PUBLICATIONS

Leschynsky et al., "Layered Alloys for Effective Magnetic Flux Concentration in Induction Heating," Materials Science—Poland, vol. 25, No. 2, 2007.*
International Search Report (PCT/ISA/210) dated Aug. 6, 2015, by the European Patent Office as the International Searching Authority for International Application No. PCT/EP2015/056173.
Written Opinion (PCT/ISA/237) dated Aug. 6, 2015, by the European Patent Office as the International Searching Authority for International Application No. PCT/EP2015/056173.
International Search Report and Written Opinion for PCT/EP2015/076983 dated Feb. 15, 2016 in 12 pages.
International-type Search Report for Swedish National Application No. 1451414-5 dated May 29, 2015 in 6 pages.
Office Action in Japanese Application No. 2016-562918, dated Mar. 5, 2019.

* cited by examiner

INDUCTION SEALING DEVICE AND METHOD OF SEALING A PACKAGING MATERIAL USING SAID INDUCTION SEALING DEVICE

FIELD OF THE INVENTION

The present invention relates to an induction sealing device, and in particular an induction sealing device for heat sealing of packaging material, in particular liquid food packaging material. The invention also relates to a method of sealing a packaging material using the induction sealing device.

BACKGROUND OF THE INVENTION

Many pourable food products, such as for example fruit juice and UHT milk, are sold in packages made of sterilized packaging material. An exemplary type of package is the one known as Tetra Evero Aseptic (registered trademark), which is a carton bottle manufactured in a highly automated filling machine. A web of laminated packaging material is cut in blanks or sheets. Each blank or sheet is formed as a sleeve and overlapping longitudinal edges of the sleeve are sealed together. Said sleeve is subsequently closed in one end in that a top of thermoplastic material is injection moulded directly on the sleeve end portion. The thermoplastic top comprises a pouring spout which is closed by for instance a screw cap. The pourable food product is filled into the package through the open sleeve end, which after filling will be sealed and folded into a flat bottom.

The packaging material has a multilayer structure substantially comprising a base layer of fibrous material, e.g. paper or carton, and a number of layers of heat-sealable polymeric material, e.g. polyethylene films, covering both sides of the base layer. The packaging material also comprises a layer of gas- and light-barrier material, e.g. aluminium foil, which is positioned in between the base layer and the heat-sealable polymeric material forming the inner face of the package eventually contacting the food product. Between the aluminium foil and the base layer there is formed an adhesion layer.

The longitudinal seal of the sleeve is made by a sealing device. Sealing devices have been used in the liquid food packaging industry for many years. Different types exist and they can be electrically heated, use ultrasonic vibrations or, where possible, utilize an electrically conductive material such as the aluminium foil layer to generate heat suitable for sealing. The latter is a so-called induction heat-sealing process, in which, eddy currents, i.e. loss currents, are induced in the aluminium layer, resulting in a localized heating and melting of the heat-sealable polymeric material layers.

More specifically, in induction heat sealing, the sealing device substantially comprises an inductor powered by a high-frequency current generator. The inductor is a coil made of electrically conductive material and the generated electromagnetic field interacts with the aluminium layer in the packaging material to induce eddy currents in it and heat it to the necessary sealing temperature. The coil is typically made of e.g. a conductive and/or metallic material such as e.g. copper.

When the heat-sealable polymeric layers on the inside and/or outside of the packaging material are melted, a sealing can be made by simultaneously pressing two heated layers together. The pressing action is accomplished by the induction sealing device and a counter-sealing element such as an anvil, that may be fitted in a sleeve-forming mandrel.

Another type of package for pourable food products is the parallelepiped-shaped package for liquid or pourable food products known as Tetra Brik Aseptic (registered trademark), which is made by folding and sealing laminated web packaging material.

Similarly, the packaging material has a multilayer structure substantially comprising a base layer for stiffness and strength, which may comprise a layer of fibrous material, e.g. paper, or mineral-filled polypropylene material; and a number of layers of heat-seal plastic material, e.g. polyethylene films, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

As is known, packages of this latter sort are produced on fully automatic packaging units, on which a continuous tube is formed from the web-fed packaging material; the web of packaging material is sterilized on the packaging unit, e.g. by applying a chemical sterilizing agent, such as a hydrogen peroxide solution, which, once sterilization is completed, is removed from the surfaces of the packaging material, e.g. evaporated by heating; and the web of packaging material so sterilized is maintained in a closed, sterile environment, and is folded and sealed longitudinally to form a vertical tube.

The tube is fed continuously in a first vertical direction, is filled with the sterilized or sterile-processed food product, and is gripped at equally spaced cross sections by two pairs of jaws. More specifically, the two pairs of jaws act cyclically and successively on the tube, and heat seal the packaging material of the tube to form a continuous strip of pillow packs connected to one another by respective transverse sealing bands, i.e. extending in a second direction perpendicular to said first direction.

The pillow packs are separated by cutting the relative transverse sealing bands, and are then fed to a final folding station where they are folded mechanically into the finished parallelepiped shape.

The tube portion gripped between each pair of jaws is heat sealed by heating means fitted to one of the jaws, known as the sealing jaw, and which locally melt the two layers of heat-seal plastic material gripped between the jaws.

The transversal sealing is performed by induction sealing, and the heating means substantially comprise an inductor powered by a high-frequency current generator and substantially comprising one or more inductor bars made of electrically conductive material, extending parallel to the second direction, and which interact with the tube material to induce a loss current in it and heat it to the necessary sealing temperature.

The other jaw, known as the counter-jaw or anvil, on the other hand, is fitted with pressure pads made of elastomeric material, and which cooperate with the inductor bars to heat seal the tube along a relative transverse sealing band.

Sealing jaw sealing devices comprising inductors of the above type are known.

More specifically, exemplary known sealing devices substantially comprise a supporting body connected integrally to the sealing jaw and defining two front seats for housing respective inductor bars; and an insert made of magnetic flux-concentrating material—in particular, a composite material comprising ferrite—and housed inside the supporting body, close to the inductor bars.

More specifically, the inductor bars are simple single or double coils for creating a magnetic field and the inserts are made of magnetic flux-concentrating material. Such known sealing devices are e.g. known from the patent documents EP 1 270 182 and EP 2 008 795.

A common problem with a single loop transversal sealing inductor is the need of different magnetic fields or different heating powers along the length of the inductor. Extra heating power is needed in the area corresponding to the corners of the packages as well as in the cross area where packing material overlap, because these areas are more difficult to seal. Currently discreet extra parts with higher magnetic properties are used for this purpose. This results in complexity and cost and also in making the manufacturing process more difficult. Also, in order to keep all the components together, an external shell of plastic material has to be used, that further increases the complexity and vulnerability to weaknesses in the plastic shell.

Since all induction sealing technology relies on the use of the aluminium layer of the packaging material, the induced heat is not always generated in the optimal way and/or not in the optimum location. Hence, there is always room for improvements with regard to the inductors used for induction sealing.

SUMMARY OF THE INVENTION

The present invention seeks to alleviate or mitigate at least some of the problems of the prior art induction sealing devices. According to a first aspect of the invention this has been achieved through an induction sealing device for heat sealing of packaging material. Said sealing device comprises a coil conductor partly encapsulated in a supporting body. Said coil conductor is adapted for cooperation with the packaging material during sealing. Said coil conductor has a reduced cross sectional area at at least one position along the coil conductor so as to concentrate the magnetic flux induced by the coil conductor at said at least one position.

In one or more embodiments said reduced cross sectional area is achieved by reducing the height of the coil conductor.

In one or more embodiments said reduced cross sectional area is achieved by reducing the width of the coil conductor (10).

In one or more further embodiments said reduced cross sectional area is achieved by reducing the width and height of the coil conductor.

In one or more embodiments the coil conductor comprises at least a first electrically conductive strip for cooperation with the packaging material during sealing. Said first conductive strip has a portion with a first cross-sectional area being smaller than a second cross-sectional area of the rest of said at least one conductive strip, wherein the first cross-sectional area is 30-70% of the area of the second cross-sectional area.

In one or more embodiments a height of the at least first conductive strip is constant, and a width of the first cross-sectional area is 30-70% of the width of the second cross-sectional area of the rest of said first conductive strip.

In one or more embodiments said conductor comprises a second conductive strip for cooperation with the packaging material during sealing, and wherein said conductor comprises first and second connectors adapted to be connected to a power supply, said first connector being connected to a first end of the first conductive strip, said second connector being connected to a first end of the second conductive strip, and a conductive bridge electrically interconnecting second ends of the first and second conductive strips in order to allow electrical current to flow through the conductor.

In one or more embodiments the first and second conductive strips are parallel and rectilinear.

In one or more embodiments the first and second conductive strips are exposed to the environment at a working surface of the induction sealing device, said working surface being adapted to cooperate with the packaging material during sealing.

In one or more embodiments a third cross-sectional area of the second conductive strip is larger than the second cross-sectional area of the first conductive strip.

In one or more embodiments a height of the first and second conductive strips is constant, and a width of the third cross-sectional area is about 15-35% larger than a width of the second cross-sectional area of said first conductive strip.

In one or more embodiments the conductor comprises a metallic material and the supporting body comprises a polymeric material and a core of a metallic material.

In one or more embodiments the induction sealing device comprises a flux-concentrating insert; and the supporting body comprises heat-conducting material and houses said coil inductor and said flux-concentrating insert.

In one or more embodiments said coil conductor is a single loop coil.

In one or more embodiments said at least one position is placed to match a packaging material overlap in the area that is arranged to be sealed by the induction sealing device.

In one or more embodiments said coil conductor has a reduced cross sectional area at a position intended to heat an edge of the sealing.

In one or more embodiments said flux concentrating insert comprises a magnetic compound of a polymer and soft magnetic particles.

Another aspect of the invention relates to a method of heat sealing a packaging material, in particular sealing together a first, inner edge and a second, outer edge of a packaging material blank in an overlapping area in which the two edges overlap. The method involves using an induction sealing device of the previously described type. The method comprises the step of locating the induction sealing device on an outer side of the overlap such that the induction sealing device will primarily be in contact with the second, outer edge, and the step of locating the induction sealing device over the overlapping area such that the first conductive strip is aligned with the first, inner edge, and such that the portion is positioned over a free edge of the packaging material blank.

BRIEF DESCRIPTION OF THE DRAWINGS

Further advantages and favorable characterizing features will be apparent from the following detailed description. Equal or corresponding elements are denominated by the same reference numbers in all figures. The features described in connection with the different embodiments can be combined as far as technically possible. The embodiments will be described with reference to the appended figures, in which.

DETAILED DESCRIPTION OF EMBODIMENTS

A first embodiment will be described in relation to FIGS. 1-8. This is an induction sealing device for use in longitudinal sealing, i.e. sealing the longitudinal ends of a sleeve of packaging material, as described in the background in relation to the carton bottle.

Figure 1:
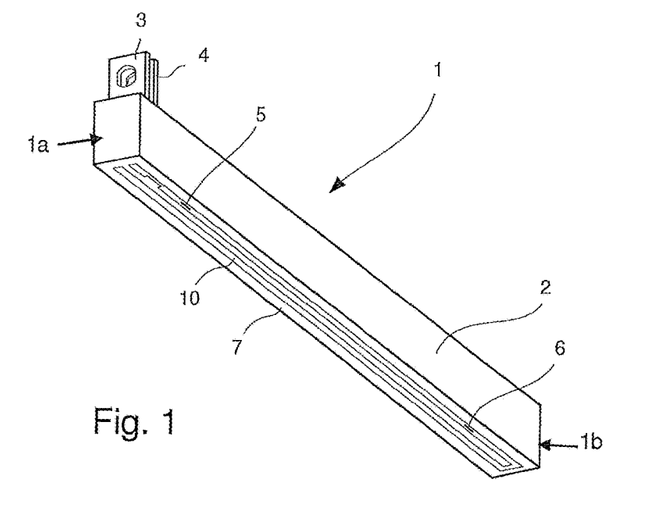
FIG. 1 is a perspective view of an inductor sealing device according to a first embodiment.
Figure 2:
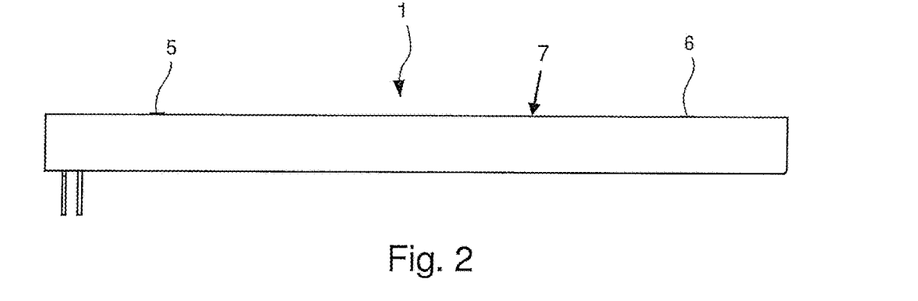
FIG. 2 is a side view of the inductor sealing device.
Figure 3:
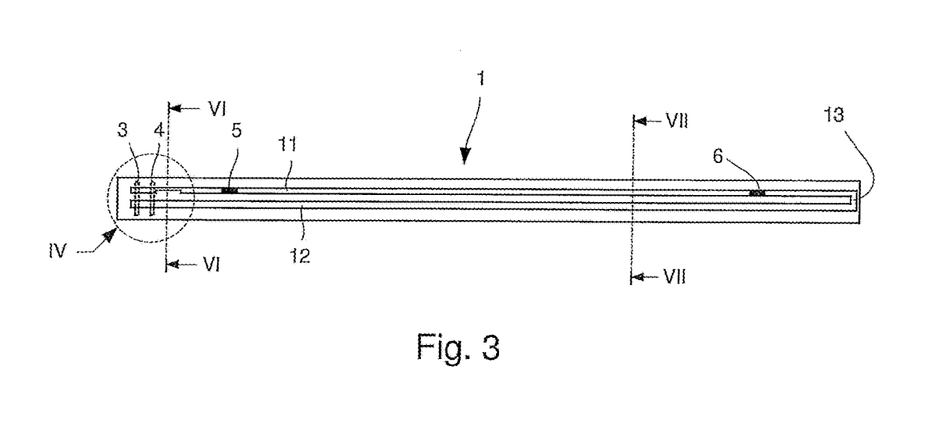
FIG. 3 is a bottom view of the inductor sealing device.

With reference to FIG. 1-3, an exemplary induction sealing device 1 for longitudinal sealing comprises an elongate supporting body 2 having a working surface 7 for cooperation with the packaging material during the sealing process. Partly encapsulated in the supporting body 2 is a conductor 10, often referred to as an inductor coil. A first connector 3 and a second connector 4 are protruded from the supporting body 2 and are arranged to be connected to a power supply (not shown), and are also connected to opposite ends of the conductor 10 for allowing electrical current to flow through the conductor 10. The conductor 10 extends rectilinearly from a first end 1a of the sealing device 10 to an opposite end 1b. It has a longitudinal extension between the first and the second ends 1a, 1b.

The supporting body 2 is typically made of a polymeric material, preferably glass-fiber reinforced polymeric material, and comprises a core of a metallic material, e.g. aluminium or steel. The conductor is made of a metallic material, preferably of one of the following materials: copper (Cu), aluminium (Al), silver (Ag), gold (Au), stainless steel, or of an alloy comprising one or several of said materials.

As seen in FIG. 1 the conductor 10 is partly encapsulated in the supporting body 2, but exposed on the working surface 7 for cooperation with the packaging material. The conductor 10 has a sealing surface substantially in level with the working surface. However, the conductor 10 is provided with a first protrusion 5 and a second protrusion 6, both protruding slightly from the working surface 7 of the induction sealing device 1, see FIG. 2. Further, the conductor 10 comprises a first conductive strip 11, a conductive bridge 13 and a second conductive strip 12. These are best seen in FIG. 3. The first and second conductive strips 11, 12 are arranged in the longitudinal direction of the induction sealing device 1, and are parallel. The conductive bridge 13 is arranged transversally to the longitudinal extension of the induction sealing device 1. The strips together form the sealing surface.

The first and second protrusions 5, 6 do not have a functional effect on the sealing quality. Instead, they are provided for enabling accurate measurements of the location of the seal on the finished package. It is also possible to modify the shape of the protrusions 5, 6 in order to identify which induction sealing device that made which sealing, in case several induction sealing devices are mounted in a filling machine.

A cross-sectional area $A_3$ of the second conductive strip 12 is larger than a cross-sectional area $A_2$ of the first conductive strip 11. One way to accomplish different cross-sectional areas is to change the size of the widths of the first and second conductive strips.

Figures 4, 5, 8:
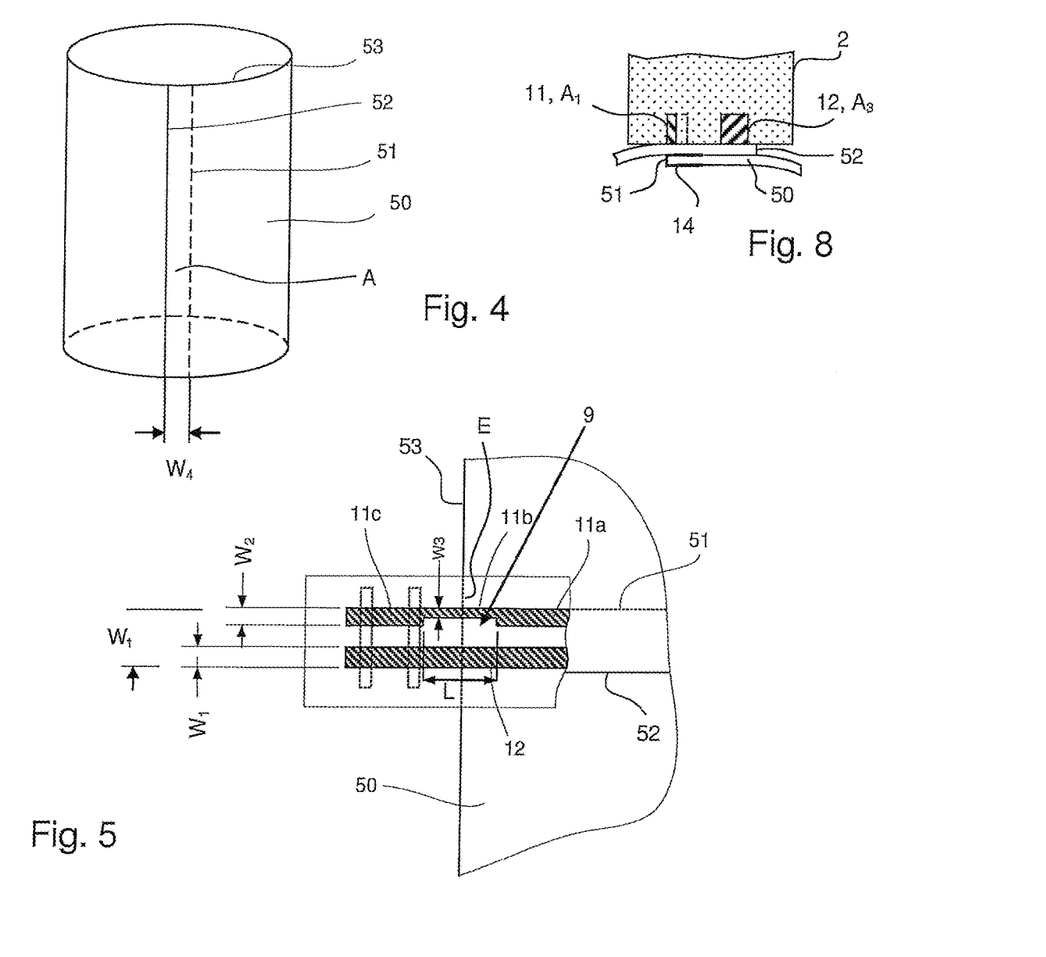
FIG. 4 is a perspective view of a packaging material sleeve, for which the inductor sealing device can be applied.
FIG. 5 is a partial view of the inductor sealing device, indicating the location of the packaging material sleeve, in use.
FIG. 8 is a partial, sectional view of the inductor sealing device and the packaging material sleeve.

The first conductive strip 11 has a width $W_2$, in the working surface, in a direction transversal to the longitudinal extension of the induction sealing device 1. The second conductive strip 12 has a width $W_1$, in the working surface, in a direction transversal to the longitudinal extension of the induction sealing device 1, which is illustrated in FIG. 5. In one embodiment the width $W_1$ of the second conductive strip 12 is slightly wider than the width $W_2$ of the first conductive strip 11, and is typically about 15-35% wider, preferably around 25% wider. The second conductive strip 12 is between 2.0 and 3.0 mm wide, or between 2.25 and 2.75 mm wide, or 2.5 mm wide. The first conductive strip 11 is between 1.5 and 2.5 mm, or between 1.75 and 2.25 mm, or 2.0 mm wide. The height H, shown in FIG. 6, of the first and second conductive strips is equal. In an alternative embodiment, not shown, the widths $W_1$ and $W_2$ are equal but the height H is not equal for the first and second conductive strips. In a further alternative embodiment the cross-sectional areas $A_3$ and $A_2$ are equal in size.

Figure 6:
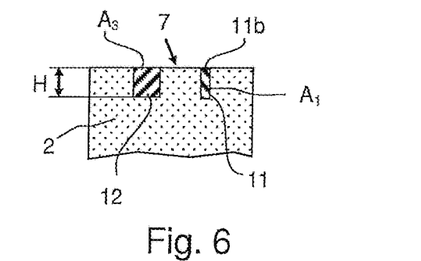
FIG. 6 is a partial, sectional view of the inductor sealing device, the section being taken along line VI-VI in FIG. 3.
Figure 7:
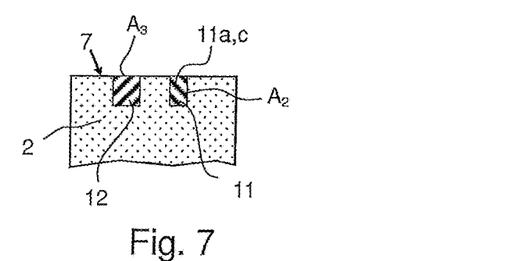
FIG. 7 is a partial, sectional view of the inductor sealing device, the section being taken along line VII-VII in FIG. 3.

The first conductive strip 11 has a portion 11b, at a position 9, with a cross-sectional area $A_1$ being smaller than the cross-sectional area $A_2$ of portions 11a and 11c of the rest of the first conductive strip 11. The cross-sectional area A1 of the portion 11b is 30-70% of the cross sectional area $A_2$ of the portions 11a and 11c of the rest of the first conductive strip 11. The cross-sectional area $A_1$ of the portion 11b is 40-60% of the cross sectional area $A_2$ of the portions 11a and 11c of the rest of the first conductive strip 11. The cross-sectional area $A_1$ of the portion 11b is 50% of the cross sectional area $A_2$ of the portions 11a and 11c of the rest of the first conductive strip 11. The difference in cross-sectional area is illustrated in FIGS. 6 and 7 showing two sections, one taken along line VI-VI (FIG. 6) and the other taken along line VII-VII (FIG. 7) of FIG. 3.

One way to accomplish a portion 11b with a smaller cross-sectional area $A_1$ is to give the portion 11b a width $W_3$ which is narrower than the width $W_2$ of the rest of the first conductive strip. Preferably, the width $W_3$ is half as wide as $W_2$. This is best shown in FIG. 5. With regard to the embodiment shown the width $W_3$ should be about 50% of the width $W_2$, or between 0.75 and 1.25 mm or between 0.875 and 1.125 mm or about 1.0 mm wide. A length L, along the longitudinal extension of the induction sealing device, of the portion 11b is between 5 and 15 mm, or between 7 and 11 mm, or about 9 mm. The centre of the portion 11b, in the longitudinal direction, is located about 1,5 times the length L from the first end of the first conductive strip 11. The centre of the portion 11b, in the longitudinal direction, will be centred over a free edge of the packaging material during sealing. This will be described later.

In use, the induction sealing device 1 of the invention is mounted in a holder which is provided with some means for bringing the induction sealing device 1 into contact with the packaging material to be sealed.

In one particular application, the induction sealing device 1 is used for making a longitudinal seal on a sleeve 50, see FIG. 4, to be used for manufacturing a carton bottle package of the type mentioned in the introduction. The sleeve 50 is made by wrapping a packaging material blank around a mandrel of the filling machine, and by sealing together edges 51, 52 thereof in an overlapping area A. The width $W_4$ of the overlap determines the size of the induction sealing device 1. In a typical application, the edges 51, 52 overlap each other by 8 mm. The total width $W_t$ between outer edges of the first and second conductive strips 11, 12 is almost as wide, or between 7 and 8 mm, or between 7 and 7.5 mm, or about 7.2 mm. The sealing of the inner edge 51 is the most important, and this is handled by the first conductive strip 11, whose outer edge is aligned with the inner edge 51 of the packaging material sleeve. The outer edge of the second conductive strip 12 is either aligned with the outer edge 52 of the packaging material sleeve 50, or is arranged slightly inside said edge, see FIG. 5. FIG. 5 is a partial view of the induction sealing device, which partial view corresponds to the dashed circle IV of FIG. 3.

A top edge 53 of the sleeve, as seen in the longitudinal direction of the sleeve, is to be located, during sealing, in the centre of the portion 11b having the smaller width $W_3$, i.e. the top edge 53 is arranged at half the length L of the portion 11b, see dashed line E indicating said top edge 53 of the sleeve 50. I.e. the centre of the portion 11b is centred over the top edge 53. The magnetic field from the conductor 10 extends outside the top edge 53 of the sleeve 50, but the induced current will follow the aluminium foil. The current will hence bend off before the edge 53 in a way that may not be optimal. In order to shape the bending of the induced current, and decrease the bending off at the top edge 53, the portion 11b with a smaller cross-sectional area $A_1$ is arranged over the edge 53 to increase the current density at that point. Since the electromagnetic field depends on the current density, according to Ampère's law, it is thus possible to shape the electromagnetic field in this way. This similarly shapes the induced current in the aluminium foil, such that sufficient heating is achieved where needed, in this case at the intersection of the inner edge 51 and the top edge 53.

FIG. 8 shows a section through the inductor sealing device along line VI-VI (FIG. 3) together with a portion of the sleeve of FIG. 4. As can be seen in the figure a strip 14 of heat sealable polymeric material is surrounding the edge 51 of the sleeve. This is to prevent the liquid food inside the package to be sucked into the raw paper edge. The strip 14 adds extra material to the area to be sealed, and therefore requires more heat to be created. This is the reason the cross-sectional area of the first conductive strip 11 is smaller than the cross-sectional area of the second conductive strip 12. The induced current will be more concentrated in the aluminium foil where the cross-sectional area is smaller, and will therefore locally create more heat.

A second embodiment of the invention will be described in relation to FIGS. 9-14. This is an induction sealing device for use in transversal sealing, i.e. transversally seal a tube of packaging material, as described in the background in relation to the parallelepiped-shaped package.

Figure 9:
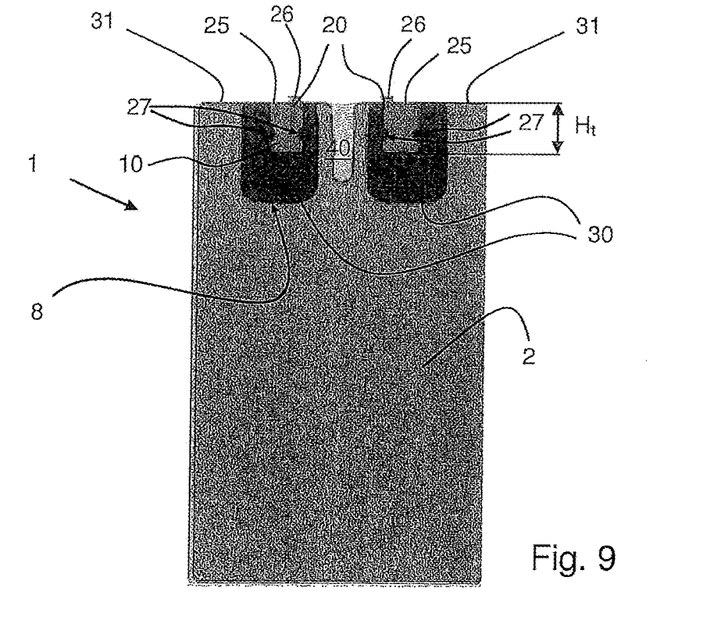
FIG. 9 is cross sectional view of a transversal sealing device along the line C in FIG. 11.
Figure 11:
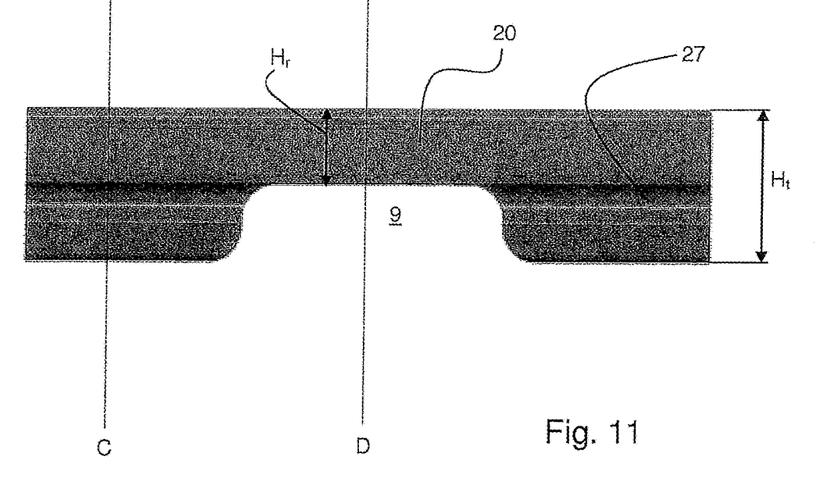
FIG. 11 is a view of the coil conductor showing the locally reduced cross section of the coil conductor.
Figure 12:
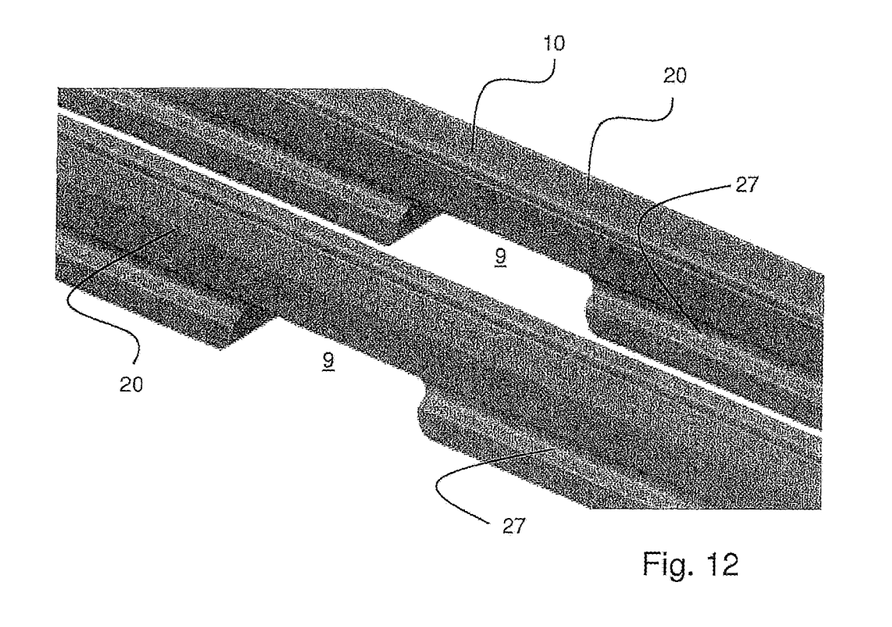
FIG. 12 is a perspective view of the coil conductor of the sealing device according to the present invention showing the locally reduced cross section of the coil conductor.

FIG. 9 is a cross-sectional view of a transversal induction sealing device 1 seen along the cross section at line C in FIG. 11. A supporting body 2 has a cavity 22, in which cavity 22 inductor device 20 is positioned. The inductor device 20 comprises a coil conductor 10 and has active surfaces 25, 26 adapted to be pressed against a packing material surface (not shown) to induce current and thereby heat in a metal layer of the packing material during a sealing process. In the cavity 22 a flux-concentrating insert 30 is moulded around the inductions means 20, without covering the active surfaces 25, 26 of the inductor device. The flux-concentrating insert has an interacting surface 31 that is in level with the active surface 25 of the inductor device 20. The inductor device 20 has a circumferential recess 27 along the outside wall of the coil conductor 10 of the inductor device for locking the inductor device in the cavity. The flux-concentrating insert 30 is moulded by a magnetic compound of a polymer and soft magnetic particles (not shown), the polymer being made by polyamide or polyphenylene sulphide and the magnetic particles being ferrite, NiZn ferrite, FeSiAl, FeSiB or FeNi-alloys. Ni Zn ferrite is preferred. The moulded material may also be reinforced by e.g. glass fiber (not shown). A cutting groove 40 is formed in the supporting body 2 to allow a packing material to be cut simultaneously with the sealing of a packing material on either side of the cutting groove 40. The opening cross section surface of each cavity 22 is smaller than the cross section surface further down in each cavity, locking the moulded flux-concentrating inserts 30 in the cavities 22. The height of the coil conductor 10, in this cross-sectional view, is denoted $H_t$.

Figure 10:
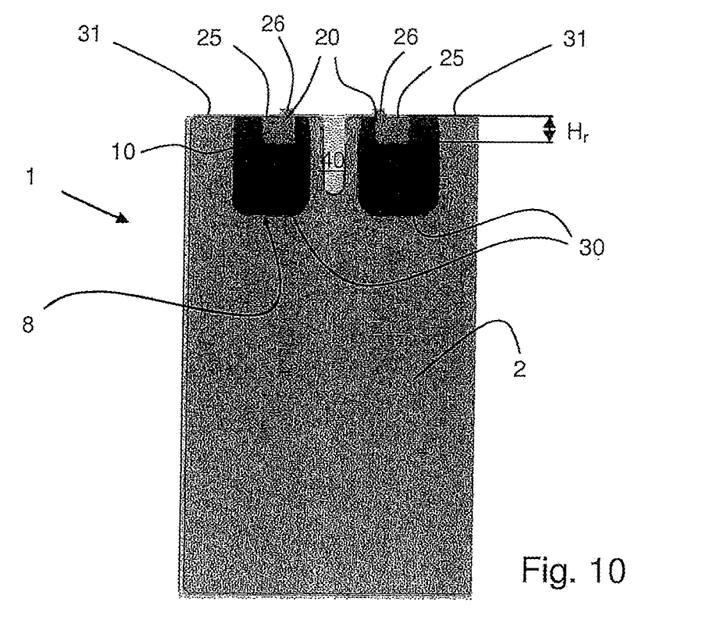
FIG. 10 is cross sectional view of a transversal sealing device along the line D in FIG. 11.

FIG. 10 is a cross-sectional view of a transversal induction sealing device 1 seen along the cross section at line D in FIG. 11. As can be seen the height of the coil conductor 10 is reduced at that position to concentrate the magnetic field, thus increasing the field strength near the active surface 25, 26. The reduced height is denoted $H_r$ in the figure.

FIG. 11 is a planar view of a coil conductor 10 of the inductor device 20. The groove 27 is also visible except at the position 9 where the cross section of the coil conductor is reduced.

Figure 13:
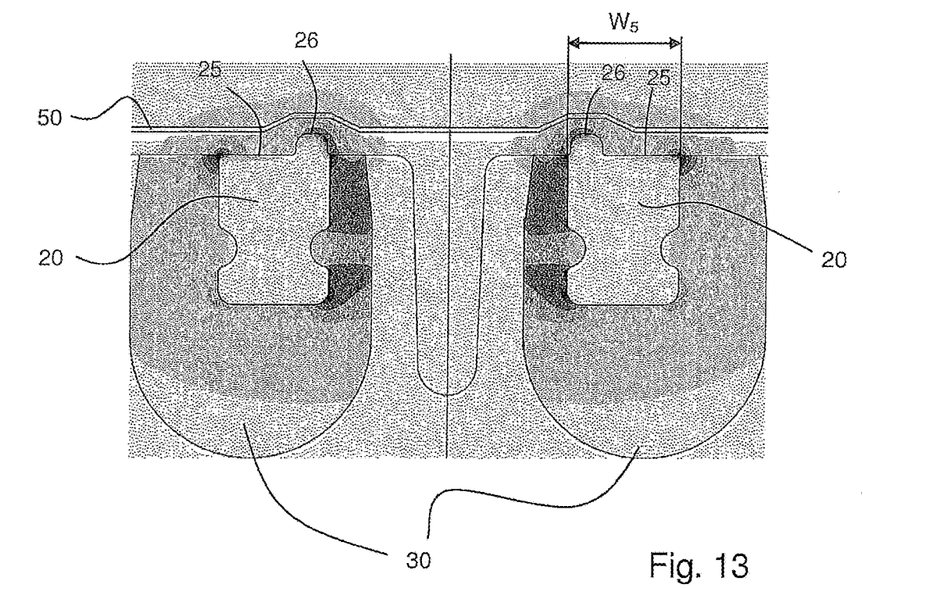
FIG. 13 is cross sectional view of the magnetic field of a transversal sealing device along the line C in FIG. 11.

FIG. 13 is a perspective view of two coil conductors 10. The groove 27 is also visible except at the position 9 where the cross section of the coil conductor is reduced. In this embodiment only the height of the coil conductor is reduced to locally reduce the cross-sectional area of the coil conductor.

Figure 14:
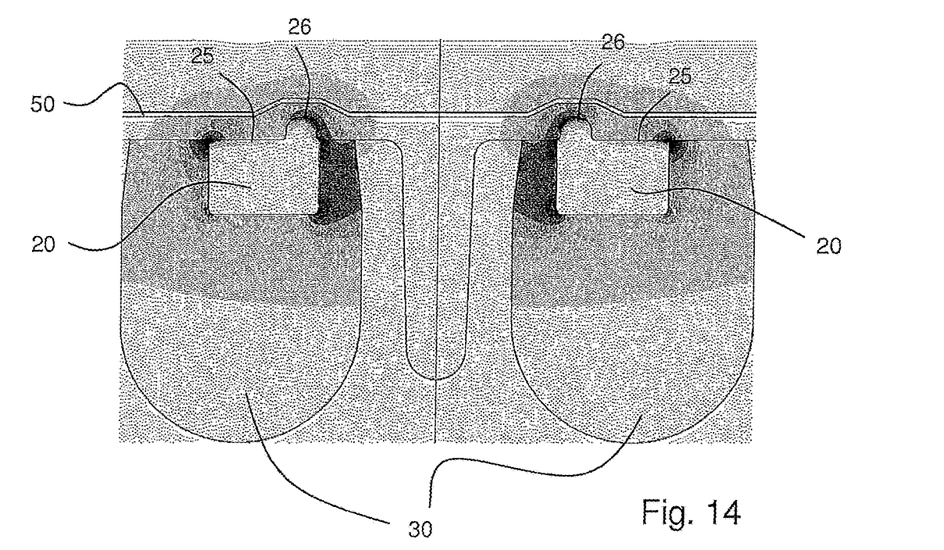
FIG. 14 is cross sectional view of the magnetic field of a transversal sealing device along the line D in FIG. 11.

FIG. 13 is a cross sectional view of the magnetic field of a transversal sealing device along the line C in FIG. 11, i.e. the same cross section as in FIG. 9. The magnetic field around the coil conductor at a position without a cross-sectional reduction is shown. In FIG. 14 a cross sectional view of the magnetic field of a transversal sealing device is shown along the line D in FIG. 11, where the cross-sectional area is reduced by reducing the height of the coil conductor. As seen in FIG. 14, the magnetic field is concentrated and locally increased around the active surfaces 25, 26 adding extra power to the heat sealing of the packaging material 50.

As can be seen in the figures the width of the coil conductor is constant in this second embodiment. The width is denoted $W_5$ and shown in FIG. 3.

It is understood that other variations in the present invention are contemplated and in some instances, some features of the invention may be employed without a corresponding use of other features. It is e.g. understood that the coil conductor may have multiple sections where the cross-sectional area is reduced. Accordingly, it is appropriate that the appended claims be construed broadly in a manner consistent with the scope of the invention.

The invention claimed is:

1. A method of heat sealing a packaging material, the method comprising the steps of:
sealing together a first, inner edge and a second, outer edge of a packaging material blank in an overlapping area in which the two edges overlap using an induction sealing device, the induction sealing device comprising:
a first conductive strip having a first cross-sectional area and a second cross-sectional area that is smaller than the first cross-sectional area; and
a second conductive strip having a third cross-sectional area that is larger than the first and second cross-sectional areas;
wherein, when the first, inner edge and the second, outer edge of the packaging material blank overlap, the packaging material blank has a first end and a second end, a length of the packaging material blank extending between the first and second ends;
positioning the induction sealing device on an outer side of the overlapping area such that the second conductive strip is proximate to the second, outer edge of the packaging material blank; and
positioning the induction sealing device over the overlapping area such that the first conductive strip is aligned with the first, inner edge of the packaging material blank and the second cross-sectional area is positioned over the first end of the packaging material blank.

2. The method according to claim 1, wherein a height of the first cross-sectional area is larger than a height of the second cross-sectional area.

3. The method according to claim 1, wherein a width of the first cross-sectional area is larger than a width of the second cross-sectional area.

4. The method according to claim 1, wherein a height of the first cross-sectional area is larger than a height of the second cross-sectional area and wherein a width of the first cross-sectional area is larger than a width of the second cross-sectional area.

5. The method according to claim 1, wherein the second cross-sectional area is 30-70% the first cross-sectional area.

6. The method according to claim 5, wherein a height of the first conductive strip is constant, and wherein a width of the second cross-sectional area is 30-70% of a width of the first cross-sectional area.

7. The method according to claim 1, wherein said induction sealing device comprises first and second connectors configured to connect to a power supply, wherein said first connector is connected to a first end of the first conductive strip, and wherein said second connector is connected to a first end of the second conductive strip, and wherein the induction sealing device further comprises a conductive bridge electrically interconnecting second ends of the first and second conductive strips in order to allow electrical current to flow therethrough.

8. The method according to claim 7, wherein the first and second conductive strips are parallel and rectilinear.

9. The method according to claim 7, wherein the first and second conductive strips are exposed to the environment at a working surface of the induction sealing device, said working surface configured to contact the packaging material blank during sealing, each of the first and second conductive strips comprising a protrusion extending outwardly beyond the working surface.

10. The method according to claim 7, wherein a height of the third cross-sectional area of the second conductive strip is larger than the a height of the second cross-sectional area of the first conductive strip.

11. The method according to claim 1, wherein a height of the first and second conductive strips is constant, and a width of the third cross-sectional area of said second conductive strip is about 15-35% larger than a width of the first cross-sectional area of said first conductive strip.

12. The method according to claim 1, wherein the induction sealing device further comprises an elongated supporting body that at least partially encapsulates the first and second conductive strips, wherein the first and second conductive strips comprise a metallic material and the elongated supporting body comprises a polymeric material and a core of a metallic material.

13. The method according to claim 12, wherein the induction sealing device further comprises a flux-concentrating insert, and wherein the elongated supporting body comprises heat-conducting material and houses said flux-concentrating insert.

14. The method according to claim 1, wherein said first and second conductive strips together comprise a single loop coil.

15. The method according to claim 1, wherein said second cross-sectional area spans a portion of a length of the first conductive strip, and wherein the second cross-sectional area is placed over the first end of the packaging material blank at a center of the portion.

16. The method according to claim 1, further comprising placing a heat sealable material around a portion of the inner edge of the packaging material blank.

17. The induction sealing device according to claim 13, wherein said flux concentrating insert comprises a magnetic compound of a polymer and soft magnetic particles.

18. The method according to claim 1, wherein the induction sealing device further comprises an elongated supporting body having cavities, each cavity at least partially encapsulating one of the first and second conductive strips, the elongated supporting body further comprising a cutting groove positioned in between the cavities.

19. The method according to claim 18, further comprising cutting a portion of the packaging material blank simultaneously when sealing together the first, inner edge and the second, outer edge of the packaging material blank in the overlapping area.

20. The method according to claim 1, further comprising wrapping the packaging material around a mandrel of a filling machine.

* * * * *